United States Patent Office 3,130,608
Patented Apr. 28, 1964

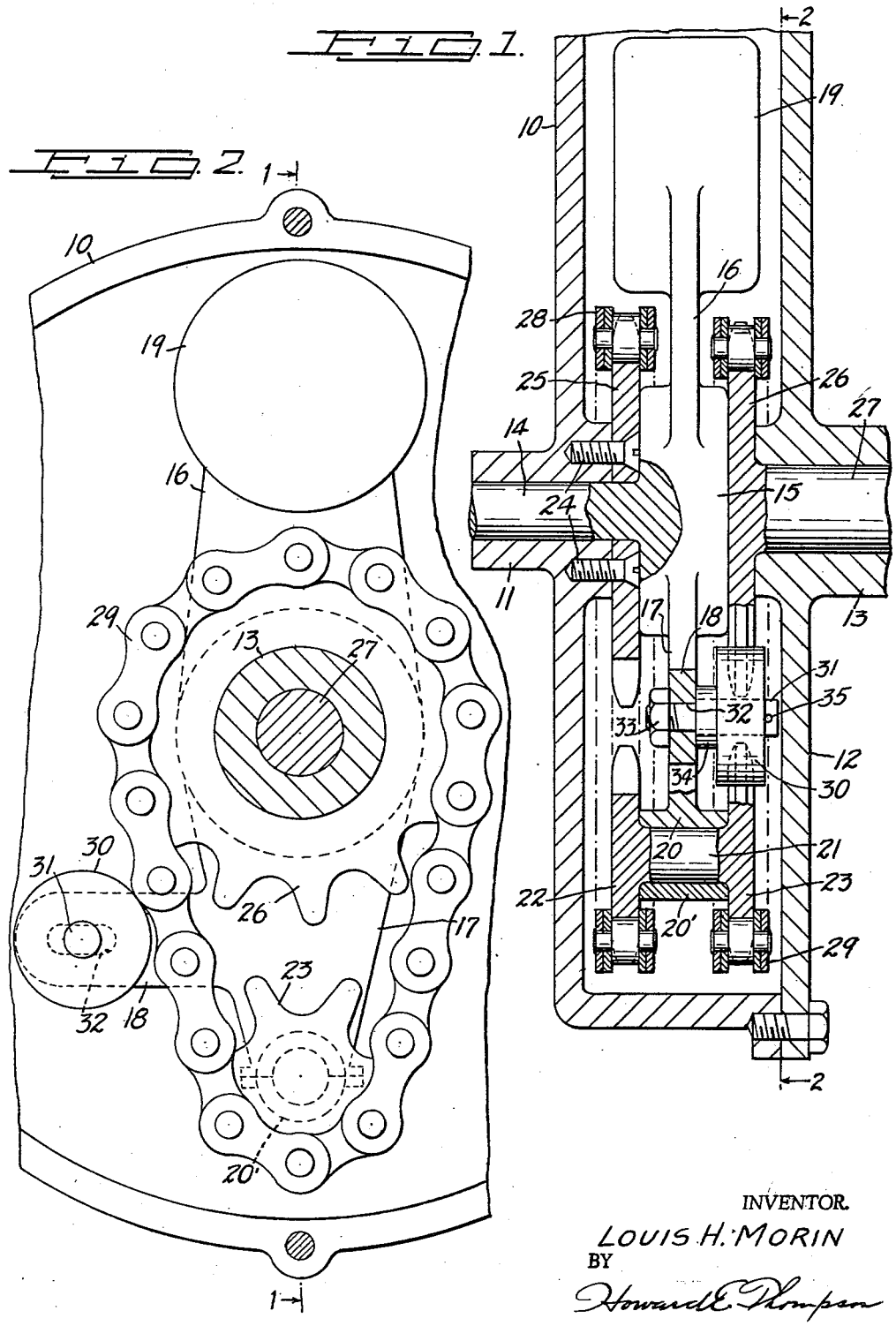

3,130,608
CHAIN-TYPE SPEED REDUCER
Louis H. Morin, Bronx, N.Y.
(125 Beechwood Ave., New Rochelle, N.Y.)
Filed Dec. 27, 1961, Ser. No. 162,464
2 Claims. (Cl. 74—797)

This invention relates to speed reducers employing chains or the like for transmitting the drive between rotatable members of the reducer in materially reducing the drive from a drive shaft to a driven shaft. More particularly, the invention deals with a reducer of the character described employing a lever driven by the drive shaft in operating chains or the like circumferentially around a fixed sprocket in reduced speed drive of the driven shaft.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a partial sectional view through a reducer made according to my invention, with parts of the construction shown in elevation and with parts broken away, the section being generally on the line 1—1 of FIG. 2; and FIG. 2 is a section substantially on the line 2—2 of FIG. 1, with part of the construction broken away.

In illustrating one adaptation and use of my invention, I have shown, in FIG. 1 of the drawing, a casing 10, having a central bearing portion 11 in one wall of the casing, the opposed side of the casing being opened and closed by a cover 12, the latter including a central bearing portion 13.

Rotatably mounted in the bearing 11 is the drive shaft 14 which, in the construction shown, includes a large hub portion 15 within the casing, the hub portion having radially extending levers 16 and 17, the lever 17 including an offset bracket portion 18, as clearly noted in FIG. 2 of the drawing. The free end of the lever 16 includes a counterweight 19 and the end of the lever 17 terminates in a bearing 20 partially formed by a removable cap 20'. Rotatably mounted in the bearing 20 is a shaft 21 having, at its ends, sprockets 22 and 23 which, in the construction shown, are illustrated as integral with the shaft 21. Both of the sprockets 22 and 23 are of the same size and include the same number of teeth.

Fixed to the casing 10, adjacent the bearing 11 by screws 24, is a stationary sprocket 25 positioned adjacent one side of the hub portion 15, as clearly noted in FIG. 1 of the drawing. At the opposed side of the hub portion 15, another sprocket 26 is arranged within the casing, the latter being shown as formed integral with a driven shaft 27 arranged in the bearing 13. In the present illustration, the sprocket 26 will have one tooth less in number than the number of teeth in the sprocket 25. Freely passed around the sprockets 22 and 25 is a chain 28, illustrated partly in section at the upper and lower portions thereof and otherwise being indicated by dot-dash lines in order to simplify the illustration. The same is true of a chain 29, which operates in conjunction with the sprockets 23 and 26, respectively. The chain 29 is illustrated diagrammatically in side elevation in FIG. 2 of the drawing and this chain is kept in taut engagement with the two sprockets 23 and 26 by an antifrictional tightener roller 30, clearly shown in FIG. 2 of the drawing. The shaft or axis 31 of the roller 30 is adjustably supported in an elongated aperture 32 in the bracket 18 in regulating engagement with the chain 29. The shaft or axis is tightened by a nut 33 drawing a shoulder portion 34 of the axis in firm engagement with the surface of the bracket 18. The roller 30 is free to rotate on 31 and is held against displacement therefrom by a suitable pin 35, note FIG. 1 of the drawing.

In operation of the reducer, it will be understood that the drive shaft 14 rotates the lever member comprising the hub 15, levers 16 and 17, counterweight 19 and the bearing 20 in the casing 10; thus moving the chain around the two sprockets 25 and 26 and, by virtue of the varied number of teeth between the sprockets 25 and 26, a material reduction in drive of the driven shaft 27 will take place. In the present diagrammatic illustration, where the sprocket 26 has one tooth less than the sprocket 25, in one complete revolution of the shaft 14, the driven shaft 27 will be rotated one twenty-fifth (1/25) of a revolution. Other ratios can be provided by varying the structure of the sprockets and the comparative number of teeth provided therein. It will also be understood that other types of annular flexible drive elements can be used other than the chains herein illustrated with a corresponding change in the structure of the members engaged by said elements. From this standpoint, the sprockets can generally be referred to as tooth-like members.

Having fully described my invention, what I claim as new and desire to secure by Letters Patent is:

1. A speed reducer of the character described, comprising a fixed casing, a drive shaft and a driven shaft both rotatable in said casing, two large diameter sprockets, two small diameter sprockets, the latter sprockets being arranged in direct alignment with said large diameter sprockets, chains operatively engaging the alined sprockets, one large diameter sprocket being fixed to the casing, the drive shaft rotating in said fixed sprocket, the other large diameter sprocket actuating said driven shaft and having a less number of teeth than the teeth in said fixed sprocket, a lever member at the inner end of said drive shaft and having a hub arranged between and spacing said large diameter sprockets, said member being actuated by said drive shaft, said small diameter sprockets having therebetween a bearing support in one end of said lever member, said bearing support being of the same width as said hub in maintaining said sprocket alinement, the opposed end of said lever member supporting a counterweight arranged beyond the periphery of said large diameter sprockets and of greater width than said hub, said small diameter sprockets being rotated in the casing circumferentially around the large diameter sprockets in movement of said flexible chains around the teeth of the large diameter sprockets in the speed reduction drive of the driven shaft by said drive shaft, and means supported on and movable with said lever member between the hub and said bearing support for applying tightening tension to one of said chains.

2. A speed reducer as defined in claim 1, wherein said last named means comprises a roller, and means for adjustably supporting the roller in connection with said lever member.

References Cited in the file of this patent
UNITED STATES PATENTS

| 1,072,834 | Devlin | Sept. 9, 1913 |
| 1,556,399 | Bartlett | Oct. 6, 1925 |

FOREIGN PATENTS

| 344,145 | France | Aug. 27, 1904 |
| 451,716 | France | Feb. 19, 1913 |
| 249,682 | Great Britain | Apr. 1, 1926 |